UNITED STATES PATENT OFFICE.

GEORG MERLING, OF FRANKFORT-ON-THE-MAIN, AND ROBERT WELDE, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

TRIMETHYL-CYCLOHEXENONCARBOXYLIC-ACID ESTER AND PROCESS OF MAKING SAME.

SPECIFICATION forming part of Letters Patent No. 743,305, dated November 3, 1903.

Application filed April 6, 1903. Serial No. 151,389. (Specimens.)

*To all whom it may concern:*

Be it known that we, GEORG MERLING, Ph.D., professor of chemistry, residing at Frankfort-on-the-Main, and ROBERT WELDE, Ph.D., residing at Höchst-on-the-Main, Germany, citizens of the Empire of Germany, have invented certain new and useful Improvements in the Manufacture of Trimethyl-Cyclohexenoncarboxylic-Acid Ester, of which the following is a specification.

We have found that sodium ethylic acetoacetate may be condensed with isopropylidene ethylic acetoacetate to trimethyl-cyclohexenoncarboxylic-acid ester according to the equation:

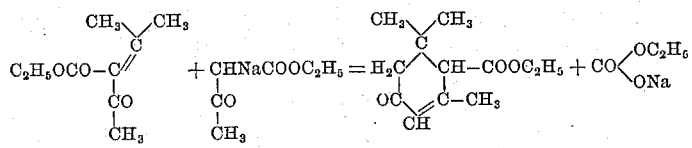

Example: Twenty-three parts, by weight, of sodium are dissolved in two hundred and fifty parts of absolute alcohol, one hundred and thirty parts of ethylic acetoacetate being added. When cold, the mixture is treated with one hundred and seventy parts of isopropylidene ethylic acetoacetate and then allowed to stand for several weeks at a low temperature, whereupon sodium ethyl carbonate separates as a powder or as crystalline crusts. The alcoholic solution is then neutralized with dilute sulfuric acid while cooling and the alcohol distilled in a vacuum at a moderate temperature. The trimethyl-cyclohexenoncarboxylic-acid ester remaining in the distillation-flask as a layer of oil is extracted with ether, the ethereal solution is dried with anhydrous sodium sulfate, and the oil remaining after distilling is purified in a vacuum by distillation.

The trimethyl-cyclohexenoncarboxylic-acid ester is to serve as parent material for perfumes.

Having now described our invention, what we claim is—

1. The herein-described process of making trimethyl-cyclohexenoncarboxylic-acid ester which consists in condensing isopropylidene ethylic acetoacetate with ethylic acetoacetate, substantially as set forth.

2. As a new product trimethyl-cyclohexenoncarboxylic-acid ester being a colorless oil, miscible with ether, alcohol and benzene, but not with water, of a feeble aromatic odor and boiling at 146° to 148° centigrade, (sixteen millimeters pressure.)

In testimony that we claim the foregoing as our invention, we have signed our names in presence of two subscribing witnesses.

GEORG MERLING.
ROBERT WELDE.

Witnesses:
ALFRED BRISBOIS,
BERNH. LEYDECKER.